United States Patent [19]

Kawase

[11] Patent Number: 4,821,280
[45] Date of Patent: Apr. 11, 1989

[54] HOLLOW-CATHODE TYPE METAL ION LASER

[76] Inventor: Hiromi Kawase, 2078-26, Masuo, Kashiwa-shi, Chiba-ken, Japan

[21] Appl. No.: 244,592

[22] Filed: Sep. 13, 1988

Related U.S. Application Data

[63] Continuation of Ser. No. 781,558, Sep. 30, 1985, abandoned.

[30] Foreign Application Priority Data

Oct. 12, 1984 [JP] Japan .................................. 59-212667
Jan. 21, 1985 [JP] Japan .................................. 60-7566

[51] Int. Cl.⁴ .............................................. H01S 3/097
[52] U.S. Cl. ........................................ 372/87; 372/56; 372/23; 372/34; 372/33; 372/88
[58] Field of Search ........................ 372/87, 88, 56, 34, 372/33, 22

[56] References Cited

U.S. PATENT DOCUMENTS

| | | | |
|---|---|---|---|
| 3,566,304 | 3/1971 | Neusel et al. | 372/59 |
| 3,585,524 | 6/1971 | Silfvast | 372/56 |
| 3,605,036 | 9/1971 | Barnaby | 372/59 |
| 3,624,548 | 11/1971 | Sosnowski | 372/56 |
| 3,663,892 | 5/1972 | Klein et al. | 372/56 |
| 3,876,957 | 4/1975 | Thatcher | 372/59 |
| 4,021,845 | 5/1977 | Wang | 372/88 |
| 4,031,484 | 6/1977 | Freiberg et al. | 372/59 |
| 4,122,411 | 10/1978 | Fein et al. | 372/33 |
| 4,224,579 | 9/1980 | Marlett et al. | 372/59 |
| 4,255,720 | 3/1981 | Wang et al. | 372/88 |
| 4,393,506 | 7/1983 | Laakmann et al. | 372/59 |
| 4,425,651 | 1/1984 | Popp et al. | 372/56 |
| 4,451,924 | 5/1984 | Liu et al. | 372/59 |
| 4,477,907 | 10/1984 | McMahan | 372/61 |
| 4,547,885 | 10/1985 | Allen et al. | 372/59 |
| 4,635,272 | 1/1987 | Kamide et al. | 372/37 |

FOREIGN PATENT DOCUMENTS

| | | | |
|---|---|---|---|
| 0078540 | 5/1983 | European Pat. Off. | 372/33 |
| 2627611 | 12/1977 | Fed. Rep. of Germany | 372/87 |
| 0078481 | 5/1983 | Japan | 372/56 |
| 0078482 | 5/1983 | Japan | 372/56 |

OTHER PUBLICATIONS

Fuji et al., "Hollow-Cathode-Type on White Light Laser", *IEEE JQE*, Mar. 1975.
Graw et al., "Design and Performance of an Improved Hollow-Cathode He-Cd Laser"; *J. Phys. D. Appl. Phys*, vol. 12, 1979.

*Primary Examiner*—Léon Scott, Jr.
*Attorney, Agent, or Firm*—Pollock, VandeSande & Priddy

[57] ABSTRACT

A hollow-cathode type metal ion laser for producing white light includes a gas-filled tubular envelope and a hollow cathode located within the tubular enelope. The hollow cathode has holes formed in a side wall portion thereof and a bore therein. The hollow-cathode type metal ion laser preferably includes a plurality of metal-containing reservoirs for diffusing vapor of the metal into the bore through the holes. Each of the metal-containing reservoirs forms a portion of the tubular envelope and is preferably disposed next to one of the holes. Further, each of the metal-containing reservoirs preferably extends downwardly. Main anodes one near each of the holes, are preferably disposed one within each of the metal-containing reservoirs. The tubular envelope preferably includes subanodes disposed on within each end portion of the tubular envelope to confine the metal vapor within the bore.

28 Claims, 6 Drawing Sheets

HOLLOW-CATHODE TYPE METAL ION LASER

This application is a continuation, of application Ser. No. 781,558, filed Sept. 30, 1985 now abandoned.

BACKGROUND OF THE INVENTION

1. Field of the Invention

This invention relates to a hollow-cathode type metal ion laser for producing white light output.

2. Prior Art

Blue, green and red laser lines, which correspond to three optical primary colors, are observed under simultaneous oscillation in hollow-cathode discharge.

Appropriate control of the relative intensities of the blue, green an red laser lines can produce 'white' light.

In this regard, for example, an article by Wong Kin-Hung and C Grey Morgan in Appl. Phys., entitled "'White' Light Laser", 16 (1983) L1–L4. printed in Great Britain, discloses a He-Cd+ laser system which provides simultaneous laser oscillations in the three primary colors, blue, green and red.

However, such prior white light lasers cannot produce continuous wave white light for very long, in practice. This is due to the fact that sputtered material, sputtered in hollow-cathode discharge, quickly covers the inner surface of the hollow-cathode and the insulators.

Therefore, the above-mentioned prior white light lasers are not suitable for use as a white light source in, e.g. a color display, in color photography or the like.

OBJECT OF THE INVENTION

The object of the invention is to provide a hollow-cathode type metal ion laser which can produce stable and reliable continuous wave white light output for a long time and thus can be used as a white light source in, e.g. a color display, in color photography, in a color copying machine, a color printer, a color hologram and the like.

SUMMARY OF THE INVENTION

In accordance with the invention there is provided a hollow-cathode type metal ion laser for producing white light, comprising a gas-filled tubular envelope; a hollow cathode located within the tubular envelope, the hollow cathode having holes formed in a side wall portion thereof and a bore therein; a plurality of main electrodes disposed one near each of the holes; and a metal-containing reservoir for diffusing vapor of the metal into the cathode bore, the metal-containing reservoir forming a portion of the tubular envelope. There may be a plurality of said metal-containing reservoirs for diffusing the metal vapor into said bore through said holes and the main electrodes may be disposed within the metal-containing reservoirs. Also, sub-anodes may be disposed in respective end portions of the tubular envelope to confine the metal vapor within the cathode bore.

A hollow-cathode type metal ion laser of the invention is capable of producing stable and reliable continuous wave white light for a considerable period for reasons explained in relation to specific embodiments of the invention hereinafter described in detail with reference to the drawings.

DETAILED DESCRIPTION OF THE PREFERRED EMBODIMENTS

FIRST EMBODIMENT

Figure 1:
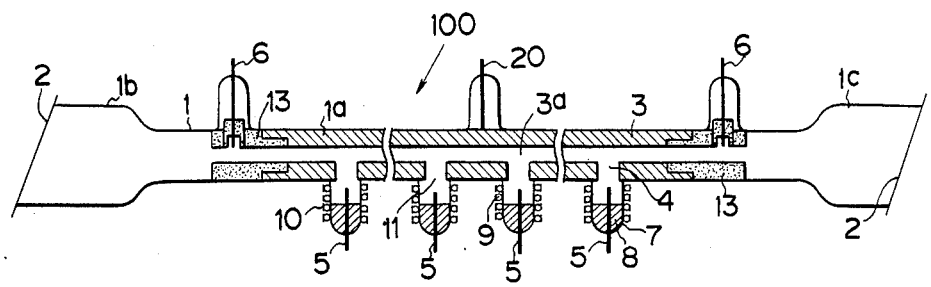
FIG. 1 is a cross-sectional view showing schematically a hollow-cathode type metal ion laser according to a first embodiment of the invention.
Figure 2:
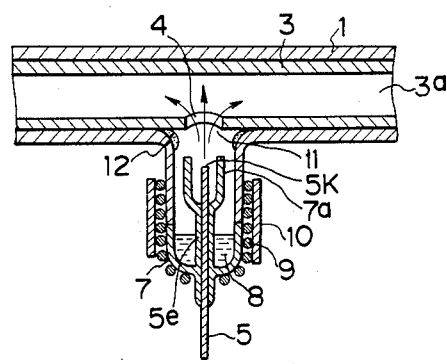
FIG. 2 is an enlarged cross-sectional view showing a portion of the hollow-cathode type metal ion laser shown in FIG. 1.

Referring to FIGS. 1 and 2, a hollow-cathode type metal ion laser 100 comprises a tubular envelope 1, a hollow cathode 3 and a plurality of main anodes 5. The hollow-cathode type metal ion laser 100 preferably comprises a plurality of metal-containing reservoirs 7 and a plurality of sub-anodes 6.

The tubular envelope 1 and the metal-containing reservoirs 7 are made of an electrically insulating material such as glass (Corning 7740 glass for example). Each of the metal-containing reservoirs 7 forms a portion of the tubular envelope 1 and is formed as a body of revolution, its wall being of U-shape in cross-sectional planes through its axis of generation. The two ends of the tubular envelope 1 are sealed to, and closed each by, a "Brewster's angle" window 2 made of quartz glass. Gas (helium gas for example) fills the tubular envelope 1 and acts as a buffer gas. For example, both end portions 1b, 1c of the tubular envelope 1 have an inner diameter of 20.0 mm.

A central portion 1a of the envelope has an inner diameter of 10.8 mm and an outer diameter of 14.0 mm.

The typical hollow cathode 3 is made of conductive material such as stainless steel. The hollow cathode 3 has an outer diameter of 10.0 mm and an inner diameter of 4.0 mm. The active cathode length of the hollow cathode 3 is 460 mm. The hollow cathode 3 is located within the tubular envelope 1 and connected to a cathode pin 20. The hollow cathode 3 has holes 4 formed in a side wall portion thereof and a bore 3a therein. The holes 4 and the bore 3a connect. The holes 4 are preferably formed at a lower position of the side wall portion, at intervals of 30 mm along its longitudinal axis.

Each of the metal-containing reservoirs 7 typically contains 1 gram of metal 8 and can diffuse the metal vapor into the bore 3a through one of the holes 4. Thus, the metal-containing reservoirs 7 are disposed next to the holes 4 and preferably extend downwardly. The metal 8 is a laser active medium such as cadmium. The metal vapor is formed by vaporization of the metal 8. To this end, each of the metal-containing reservoirs 7 is surrounded by an external heater wire 9 and a heat insulating material 10 made of glass tape. The external heater wire 9 is electrically connected to an a.c. power supply and a controller (not shown). The external heater wire 9 is capable of heating a discharge space 11 and the metal 8.

For example, the external heater wire 9 can heat the metal 8 at 294° C. (at cadmium vapor pressure; PCd=$2 \times 10^{-2}$ Torr).

The main anodes 5, of which there are typically 13 in number, are preferably disposed one within each of the metal-containing reservoirs 7, respectively. Each of the main anodes 5 is disposed near one of the holes 4. In this embodiment, the 13 main anodes 5 are made of tungsten. As shown in FIG. 2, a central portion of each of the main anodes 5 is covered by an electrical insulator 5e made of glass (Corning 7740 glass for example). An upper portion 5k of each of the main anodes 5 is surrounded by an electrical insulator 7a made of glass (Corning 7740 glass for example). The insulator 7a is shaped like the reservoir 7 and has a U-shaped cross-section. The main anodes 5 are preferably arranged at intervals of 1 mm where the interval 1 is determined from the expression $$l = 10\sqrt{D} \text{ [mm]}$$

D being the bore 3a diameter [mm]

The sub-anodes 6 are preferably disposed one within the respective end portions of the tubular envelope 1. The sub-anodes 6, which act to confine the metal vapor within the bore 3a, are made of tungsten. Although not shown, a d.c. power supply is used for generating a main-discharge between the hollow cathode 3 and the main anodes 5. Further, the d.c. power supply is also used for generating a cataphoretic confinement discharge between the hollow cathode 3 and the sub-anodes 6. Tubes 13 made of electrically insulating material are disposed one within each of the end portions of the tubular envelope 1 and connected to the respective ends of the hollow cathode 3.

In laser operation, the helium gas pressure within the tubular envelope 1 is kept at 8 Torr for example. A desired voltage (i.e. 600 V) is applied between the hollow cathode 3 and each of the main anodes 5 via a resistor (not shown).

The desired voltage is applied also between the hollow cathode 3 and each of the sub-anodes 6 again via a resistor (not shown).

Thus, for example, a discharge current of 980 mA is produced at ambient temperature. However, when the metal vapor pressure is at a desired value, the discharge current is 660 mA. The temperature of the tubular envelope 1, measured on its outer surface, is kept at 350° C. First, a negative glow discharge generates within the bore 3a of the hollow cathode 3. Next, a positive column discharge generates within the discharge space 11.

Next, when current is supplied to the external heater wires 9, the heated tubular envelope 1 and the external heater wires 9 heat the metal-containing reservoirs 7.

The temperature of the metal-containing reservoirs 7 may be controlled by a suitable controller (now shown). Therefore, the metal 8 is vaporized. The metal vapor pressure can be maintained at the optimum value without difficulty.

The metal (e.g. cadmium) atoms can be moved towards the negative glow discharge region within the bore 3a by the cataphoretic transport effect in the positive column discharge of the helium gas in the spaces 11. That is, the electrically neutralized metal atoms are fully ionized by the metastable helium gas, and the metal ions are introduced to the negative glow discharge region with a flow of helium ions. The metastable helium gas and the excited helium ions within the bore 3a excite the metal ions to higher levels, and an inverted population appears between energy levels of the metal ions.

Thus, first of all, a blue line oscillates (at a wavelength of 441.6 nm). Next, green lines oscillate (at wavelengths of 533.7 nm, 537.8 nm). Finally, red lines oscillate (at wavelengths of 635.5 nm, 636.0 nm). Appropriate control of the relative intensities of the blue, green and red lines can produce coherent, continuous wave white light.

During laser operation, the inner surface of the hollow cathode 3 is sputtered by helium ions and metal ions. The sputtering yield of the hollow cathode 3 moves towards the discharge spaces 11 through the holes 4. The sputtering yield 12 covers the inner surface of the upper portion of each of the metal-containing reservoirs 7. However, because the sputtering yield 12 is positioned within the metal-containing reservoirs 7, the negative glow discharge within the bore 3a is not affected by the sputtering yield 12.

Because the metal vapor moving towards the "Brewster's angle" window 2 is screened by the cataphoretic transport effect within the tubes 13, the "Brewster's angle" window 2 is not covered by the metal vapor. Therefore, the hollow-cathode type metal ion laser according to this embodiment can produce coherent white light along the longitudinal axis of the tubular envelope 1 for a time exceeding 750 hours.

Now the white light can be divided into its component primary colors by a prism (not shown).

When finishing the laser operation, current is no longer supplied to the external heater wires 9. As a result, the temperature of each of the metal-containing reservoirs 7 is lowered below that of the tubular envelope 1. The metal vapor within the bore 3a is transported back to the metal-containing reservoirs 7. In this way, the loss of the metal vapor within the bore 3a is greatly reduced. Furthermore, because only the negative glow discharge of the helium gas generates within the bore 3a, the inner surface of the hollowcathode 3 is cleaned up by the sputtering of the helium ions. Also, because the upper end portions 5k of the main anodes 5 are baked by the radiant heat of the tubular envelope 1, these upper end portions 5k of the main anodes 5 are not covered by a metal film and can be insulated from the metal 8. Again, because the metal 8 is inserted in the metal-containing reservoirs 7, the metal 8 and the hollow cathode 3 can be separately baked.

SECOND EMBODIMENT

Figure 3:
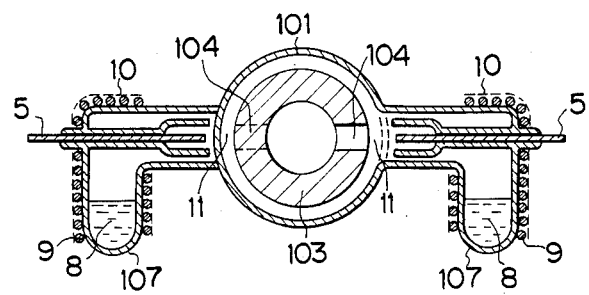
FIG. 3 is an enlarged cross-sectional view showing a second embodiment of the invention.

FIG. 3 shows a second embodiment of the invention which is substantially the same as the first embodiment of FIGS. 1 and 2 except for metal-containing reservoirs 107, and a hollow cathode 103 having holes 104 formed at a side portion of the side wall portion thereof at given intervals. The metal-containing reservoirs 107 are again disposed one next to each of the holes 104, and each extends downwardly. In other words, metal-containing reservoirs 107 are positioned opposite one another at right and left sides of a tubular envelope 101 and with opposing pairs of reservoirs spaced apart at a given distance along the longitudinal axis of the envelope 101. Thus, when heat expands the tubular envelope 101 along its longitudinal axis, the tubular envelope 101 is not bent by the expansion effect.

THIRD EMBODIMENT

Figures 4, 5:
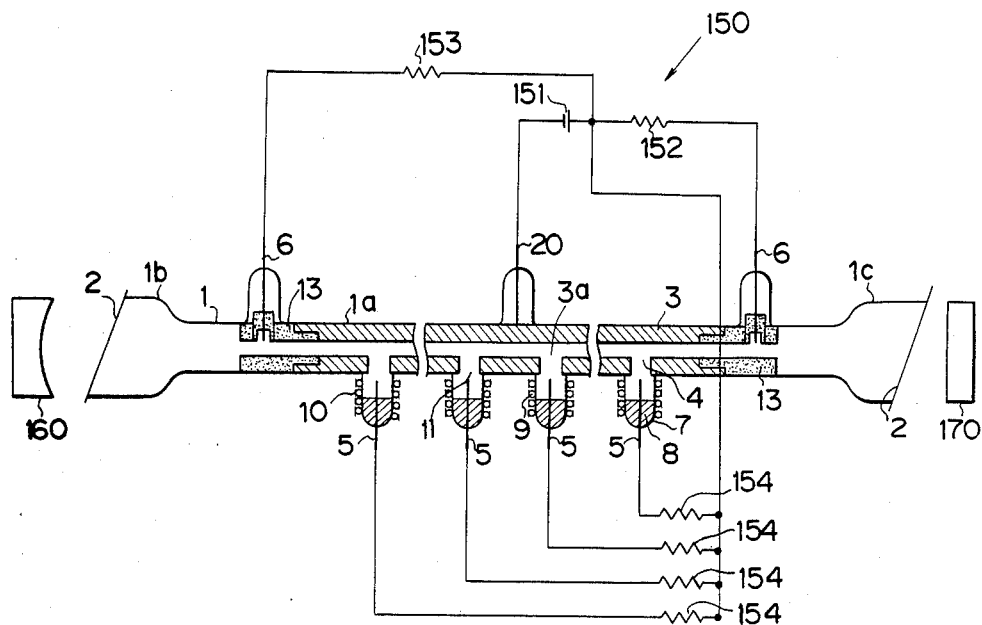
FIG. 4 is a cross-sectional view showing schematically a third embodiment of the invention.
FIG. 5 is a cross-sectional view showing schematically a fourth embodiment of the invention.

FIG. 4 shows a third embodiment of the invention which is substantially the same as the first embodiment of FIGS. 1 and 2 except for the provision of laser mirrors 160, 170 and an external circuit 150. The laser mirrors 160, 170 face respectively the "Brewster's angle" window 2. The laser mirror 160 can reflect white light. The laser mirror 170 can transmit white light. A single light beam is therefore transmitted.

The external circuit 150 includes a d.c. power supply 151 and resistors 152, 153 and 154, there being four resistors 154 in all. The resistors 152, 153 and 154 typically may be 5 kiloohms. The output voltage of the d.c. power supply 151 typically may be 600 V. The cathode pin 20 and the right sub-anode 6 are coupled to the d.c. power supply 151 via the resistor 152. The cathode pin 20 and the left sub-anode 6 are coupled to the d.c. power supply 151 via the resistor 153. Further, the cathode pin 20 and each of the main anodes 5 are coupled to the d.c. power supply 151 via a resistor 154.

FOURTH EMBODIMENT

Figure 6:
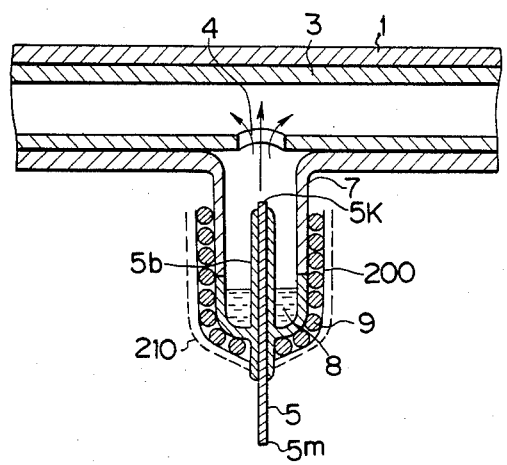
FIG. 6 is an enlarged cross-sectional view showing a portion of the fourth embodiment shown in FIG. 5.
Figure 7:
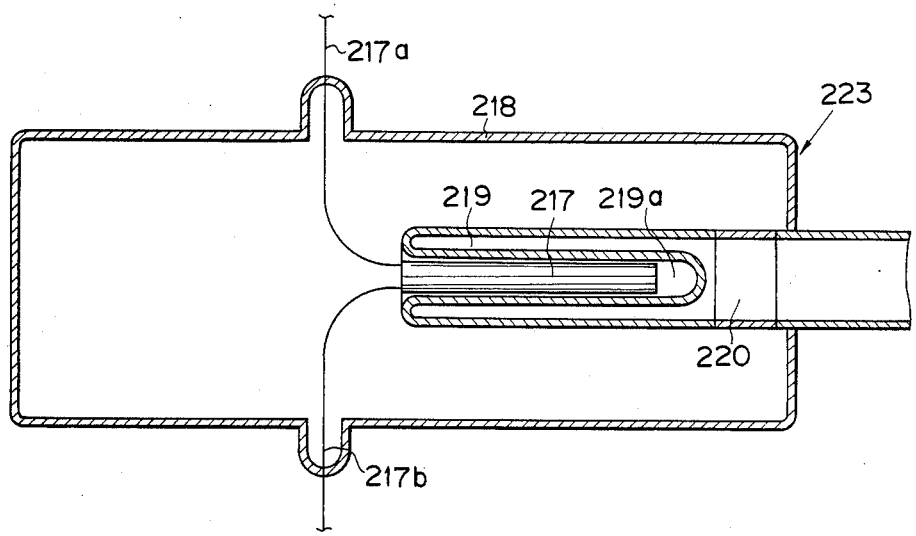
FIG. 7 is an enlarged cross-sectional view showing a gas pressure regulator of FIG. 5.

FIGS. 5 to 7 show a fourth embodiment of the invention which is substantially the same as the first embodiment of FIGS. 1 and 2 except for an apparatus 216, a gauge 214, getters 215 and a portion of the metal-containing reservoirs 7.

Each of the metal-containing reservoirs 7 is surrounded by a metal film 200 and a heat insulating material 210 as shown in FIG. 6. Further, each of the 15 main anodes 5 in this example is covered by an insulator 5$b$ except its inner end portion 5$k$ and a lead portion 5$m$. In addition, tubes 213 made of electrically insulating material are connected one to each end of the hollow cathode 3.

The getters 215 are provided to absorb impurities except the helium gas and the metal vapor within the tubular envelope 1. The getters 215 are connected to the tubular envelope 1 by way of tubes 215$a$, respectively. A getter metal 215$b$ such as barium is inserted in each of the getters 215.

The gauge 214 is provided to sense the helium gas pressure within the tubular envelope 1. The gauge 214 is preferably a quartz oscillator vacuum gauge.

The apparatus 216 is provided to compensate for a loss of the helium gas within the tubular envelope 1. The apparatus 216 includes a gas pressure regulator 223 and a controller 216$a$. The gas pressure regulator 223 includes an outer tube 218 and an inner, duplex tube 219. The outer tube 218 is preferably made of Corning 7740 glass. The inner duplex tube 219 is preferably made of quartz glass. The permeability coefficient of the helium gas for Corning 7740 glass is relatively low. The permeability coefficient of the helium gas for the quartz glass is relatively high.

The inner duplex tube 219 forms a space 219$a$. A heater 217 made of ceramic material is inserted into the space 219$a$. One end of the inner duplex tube 219 is connected to the gauge 214 via tubes 220, 222. The tube 222 is connected to an extension tube 221 of the tubular envelope 1. The extension tube 221 and the tube 222 are made of glass (Corning 7740 glass for example). The tube 220 is made of Corning 7913 glass.

Helium gas pressure within the outer tube 218 is typically 600 Torr. Supply leads 217$a$, 217$b$ of the heater 217 are coupled to the controller 216$a$.

A signal S1 is applied to the controller 216$a$ from the gauge 214. The controller 216$a$ can compare the signal S1 level with the predetermined optimum level. When the signal S1 level is lower than the optimum level, that is, when the helium gas pressure present within the tubular envelope 1 is lower than the optimum pressure, current is supplied to the heater 217 from the controller 216$a$.

In laser operation, the helium gas pressure within the tubular envelope 1 is kept at 9 Torr. 560 volts are applied between the hollow cathode 3 and each of the main anodes 5 via a resistor (not shown). 650 volts are applied between the hollow cathode 3 and each of the sub-anodes 6 via a resistor (not shown).

Thus, the hollow-cathode type metal ion laser according to this embodiment can produce coherent white light in the same manner as the first embodiment.

In the above-mentioned operation, the getters 215 can absorb the impurities (i.e. oxygen and nitrogen). Further, because the helium positive ions and the metal positive ions are trapped by the hollow cathode 3, the amount of the helium gas is lost at a rate of 0.037 Torr l/hour. The gauge 214 can sense the helium gas pressure and apply the signal S1 to the controller 216$a$. Current is supplied to the heater 217 from the controller 216$a$. Thus, the heater 217 heats the helium gas within the outer tube 218. The additional helium gas is transmitted through the inner duplex tube 219. The additional helium gas is supplied within the tubular envelope 1 until the sensed helium gas pressure within the tubular envelope 1 is substantially equal to the optimum pressure. When the sensed helium gas pressure is substantially equal to the optimum pressure, the current supply to the heater 217 is switched off. Therefore, additional helium gas is no longer supplied to the tubular envelope 1. The tubular envelope 1 can operate at the optimum condition for a long time using this system.

Figure 8:
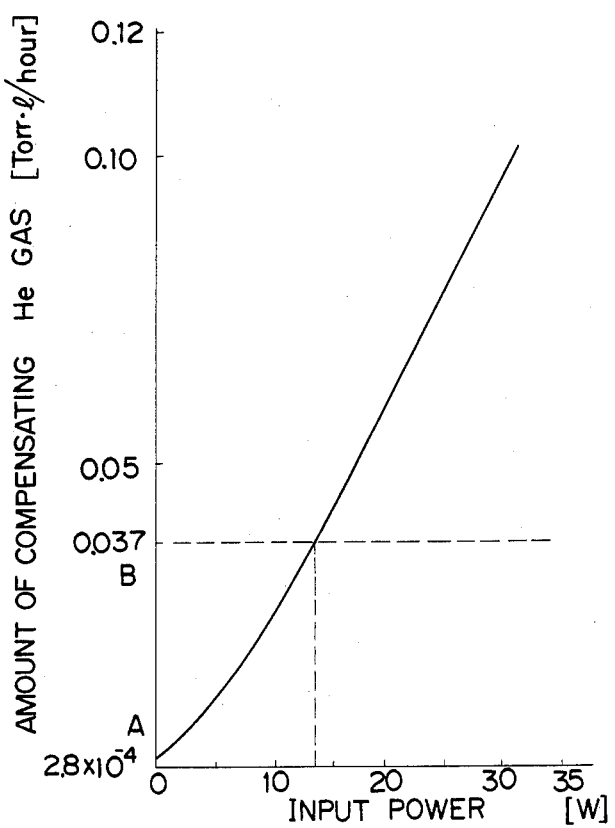
FIG. 8 shows the typical relation between the input power of a heater and the amount of compensating helium gas in the fourth embodiment of the invention.

FIG. 8 shows the typical relation between the input power supplied to the heater 217 and the amount of compensating helium gas. As shown in FIG. 8, when 13 W is applied to the heater 217, make-up helium gas is supplied to the tubular envelope 1 at a rate of 0.037 Torr l/hour (see the point B). However, when the input power is zero, the helium gas is supplied to the tubular envelope 1 at a rate of $2.8 \times 10^{-4}$ Torr l/hour (see the point A).

Figure 9:
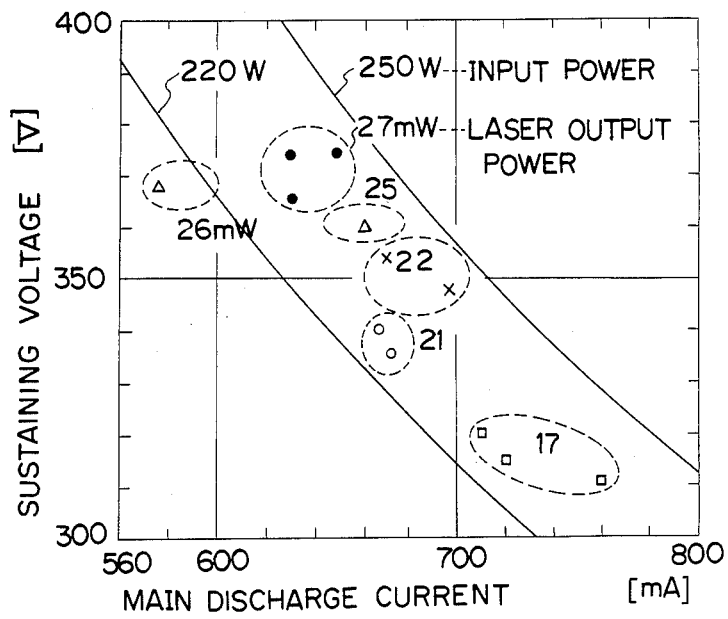
FIG. 9 shows laser output characteristics in the fourth embodiment of the invention.

FIG. 9 shows laser output characteristics of the fourth embodiment. For example, the main discharge current is set at 630 mA. A sustaining voltage applied between the hollow cathode 3 and each of the main anodes 5 is set at 365 V. In this case, the input power is 230 W. The laser output obtained (i.e. white light output) is 27 mW.

FIFTH EMBODIMENT

Figure 10:
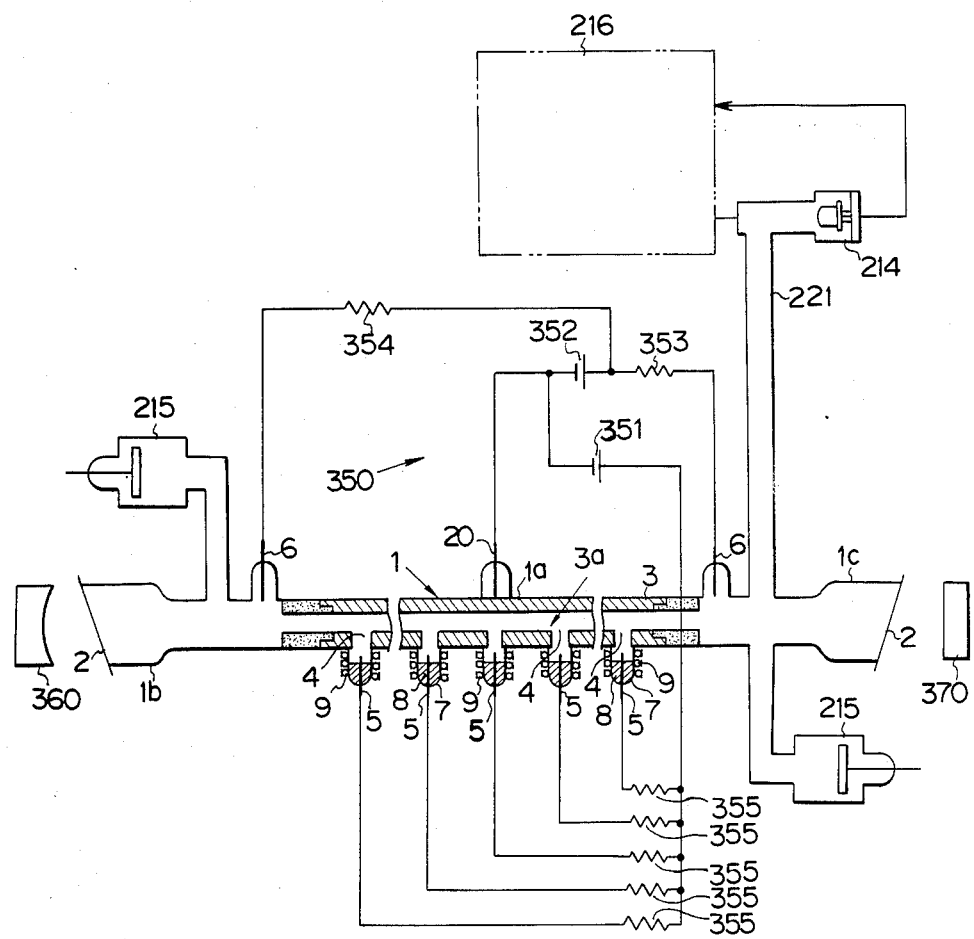
FIG. 10 is a cross-sectional view showing schematically a fifth embodiment of the invention.

FIG. 10 shows a fifth embodiment of the invention which is substantially the same as the fourth embodiment of FIGS. 5 to 7 except for an external circuit 350 and laser mirrors 360, 370, which have the same function as the mirrors 160, 170 described with reference to FIG. 4. The external circuit 350 includes d.c. power supplies 351 and 352 and resistors 353, 354 and 355. The resistors 353, 354, 355 typically may be 5 kiloohms. The output voltage of the d.c. power supply 351 typically may be 560 V. The output voltage of the d.c. power supply 352 typically may be 650 V. The cathode pin 20 and the right sub-anode 6 are coupled to the d.c. power supply 352 via the resistor 353. The cathode pin 20 and the left sub-anode 6 are coupled to the d.c. power supply 352 via the resistor 354. The cathode pin 20 and each of the main anodes 5 are coupled to the d.c. power supply 351 via a resistor 355.

SIXTH EMBODIMENT

Figure 11:
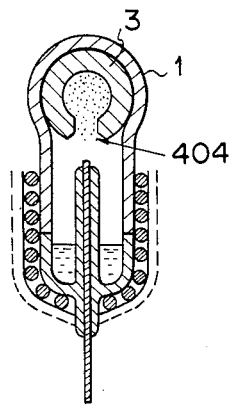
FIG. 11 is an enlarged cross-sectional view showing a portion of a sixth embodiment of the invention.

Referring to FIG. 11, a six embodiment is substantially the same as the fourth embodiment of FIGS. 5 to 7 except for holes 404. The hollow cathode 3 has tapered holes 404 in this case, formed at the lower position of the side wall portion thereof. In this fashion a low noise, hollow-cathode type metal ion laser is obtained.

SEVENTH EMBODIMENT

Figure 12:
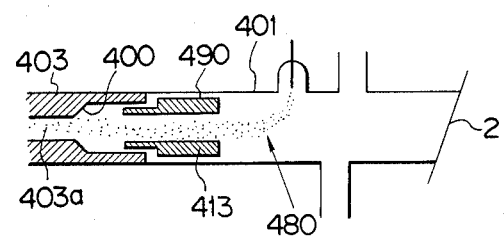
FIG. 12 is a cross-sectional view showing schematically a portion of a seventh embodiment of the invention.

Referring to FIG. 12, a seventh embodiment is substantially the same as the fourth embodiment of FIGS. 5 to 7 except for both end portions of a hollow cathode 403 and tubes 413. Because both end portions of a hollow-cathode type metal ion laser according to the seventh embodiment are substantially the same, FIG. 12 shows only one of the end portions of the hollow-cathode type metal ion laser. A tapered portion 400 is formed inside both end portions of the hollow cathode 403. The tubes 413 disposed one within each end portion of the tubular envelope 401 are made of electrically insulating material.

Thus, the metal vapor passes through a gap 490 and is ionized within a plasma space 480. Further, the ionized metal vapor can be transported back to the bore 403a by the cataphoresis transport effect. Because of this the "Brewster's angle" windows 2 are not covered by the metal (cadmium) vapor.

EIGHTH EMBODIMENT

Figure 13:
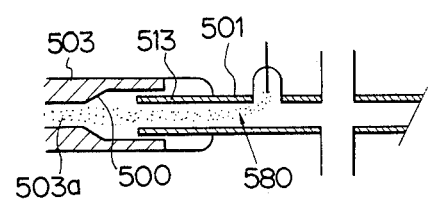
FIG. 13 is a cross-sectional view showing schematically a portion of an eighth embodiment of the invention.

Because both end portions of a hollow-cathode type metal ion laser according to an eighth embodiment are substantially the same, FIG. 13 shows only one of the end portions of the hollow-cathode type metal ion laser. A tapered portion 500 is formed inside each end portion of a hollow cathode 503. The tubes 513 disposed one within each of the end portions of the tubular envelope 501 are made of electrically insulating material.

Thus, the metal vapor is ionized within a plasma space 580 and transported back to the bore 503a by the cataphoretic transport effect. Therefore, the Brewster's angle windows 2 are not covered by the metal vapor.

NINTH EMBODIMENT

Figure 14:
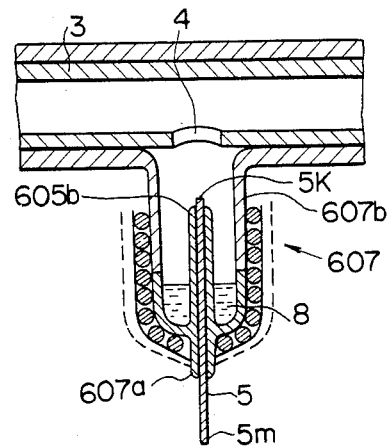
FIG. 14 is a cross-sectional view showing a portion of a ninth embodiment of the invention.

FIG. 14 shows a portion of a ninth embodiment of the invention which is substantially the same as the fourth embodiment of FIGS. 5 to 7 except for a metal-containing reservoir 607. A lower portion 607a of the metal-containing reservoir 607 is made of Corning 3320 glass. An upper portion 607b of the metal-containing reservoir 607 is made of Corning 7740 glass. The main anode 5 is covered by an insulator 605b such as Corning 3320 glass except for its inner end portion 5k and its lead portion 5m.

TENTH EMBODIMENT

Figure 15:
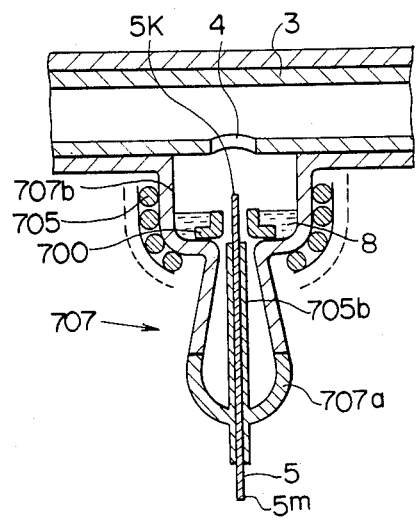
FIG. 15 is a cross-sectional view showing a portion of a tenth embodiment of the invention.

FIG. 15 shows a portion of a tenth embodiment of the invention which is substantially the same as the the fourth embodiment of FIGS. 5 to 7 except for a metal-containing reservoir 707. The metal-containing reservoir 707 is made of Corning 7740 glass except for a lower portion 707a thereof. The lower portion 707a is made of Corning 3320 glass. The main anode 5 is covered by an insulator 705b such as Corning 3320 glass except for its inner end portion 5k and its lead portion 5m. The metal 8 (cadmium for example) is inserted in an upper portion 707b of the reservoir and surrounded by an external heater wire 705. A member 700 disposed within the upper portion 707b can store the metal 8. The metal 8 is thus separated from the lower portion 707a.

The invention is not limited to the abovementioned embodiments and may be carried out in any other way within the scope of the claims.

For example, the tubular envelope and the metal-containing reservoirs may be made of ceramics. Further, the tubular envelope and the metal-containing reservoirs may be made of glass such as Corning 1720 glass.

The hollow cathode 3 may be made of conductive material such as iron. Typical materials for the metal 8 include cadmium, zinc, tellurium and selenium.

Further, in the fourth embodiment, the tubular envelope 1 may have only one of the getters 215. In addition, the outer tube 218 may be connected to a tube for supplying a high pressure helium gas thereto. The outer tube 218 may be surrounded by an external heater wire instead of providing the heater 217. A plain tube may be used instead of the inner duplex tube 219.

Further, the hollow cathode 3 may be made of conductive materials such as cobalt, chromium, titanium, molybdenum and tungsten.

I claim:
1. A hollow-cathode type metal ion laser, comprising:
   a gas-filled tubular envelope;
   a hollow cathode located within the tubular envelope, the hollow cathode having holes formed in a wall portion thereof and a bore therein;
   a plurality of metal-containing reservoir means each containing a metal therein and having a discharge space near the envelope for vaporizing and diffusing said metal into the discharge space near each of the holes, each of the metal-containing reservoir means being disposed one next to each of the holes;
   a plurality of main anodes disposed one within each of the metal-containing reservoir means, each of the main anodes being disposed near one of the holes;
   a gauge for sensing the gas pressure within the tubular envelope;
   means responsive to a loss of gas within the tubular envelope for supplying gas to the envelope until the sensed gas pressure is substantially equal to a predetermined desired pressure; and a getter for absorbing impurity gas within the tubular envelope;

each of the reservoir means being connected via each of the holes into the bore;

a plurality of external heaters each surrounding each of the metal-containing reservoir means for heating the reservoir means;

each of the main anodes having an end portion positioned near each hole of the cathode such that each end portion of the main anodes is baked by the radiant heat of the cathode;

each of the metal-containing reservoir means including an open area having an axis substantially coaxial with the central axis of each hole at least near the envelope;

the diameter of each hole being smaller than that of each open area of the metal-containing reservoir means near the envelope;

the discharge space within the reservoir means being positioned only at one side of the envelope with respect to each hole of the cathode;

a sub-anode disposed within each end portion of the tubular envelope for confining the metal vapor within the cathode bore; and an insulator tube likewise disposed within each end portion of the tubular envelope.

2. A hollow-cathode type metal ion laser as claimed in claim 1, wherein the gas is helium.

3. A hollow-cathode type metal ion laser as claimed in claim 1, wherein the metal is cadmium.

4. A hollow-cathode type metal ion laser as claimed in claim 1, wherein the metal is zinc.

5. A hollow-cathode type metal ion laser as claimed in claim 1, wherein the metal is tellurium.

6. A hollow-cathode type metal ion laser as claimed in claim 1, wherein the metal is selenium.

7. A hollow-cathode type metal ion laser as claimed in claim 1, wherein the tubular envelope and the metal-containing reservoir means are made of glass.

8. A hollow-cathode type metal ion laser as claimed in claim 1, wherein the tubular envelope and the metal-containing reservoir means are made of ceramic material.

9. A hollow-cathode type metal ion laser as claimed in claim 1, wherein the hollow cathode is made of iron.

10. A hollow-cathode type metal ion laser as claimed in claim 1, wherein the hollow cathode is made of stainless steel.

11. A hollow-cathode type metal ion laser as claimed in claim 1, wherein the holes are formed at a bottom part of the wall portion at regular intervals, and wherein the metal-containing reservoir means extend downwardly.

12. A hollow-cathode type metal ion laser as claimed in claim 11, wherein each of the main-anodes is covered by an insulator, except its inner end portion.

13. A hollow-cathode type metal ion laser as claimed in claim 11, wherein each of the metal-containing reservoir means is surrounded by an external heater.

14. A hollow-cathode type metal ion laser as claimed in claim 1, wherein the holes are formed at a side part of the wall portion at regular intervals, and wherein the metal-containing reservoir means extend downwardly.

15. A hollow-cathode type metal ion laser as claimed in claim 14, wherein each of the metal-containing reservoir means is surrounded by an external heater.

16. A hollow-cathode type metal ion laser as claimed in claim 1, wherein the holes of the hollow cathode are tapered.

17. A hollow-cathode type metal ion laser as claimed in claim 1, wherein the ends of the tubular envelope are sealed each to a Brewster's angle window.

18. A hollow-cathode type metal ion laser as claimed n claim 1, wherein a tapered portion is formed inside each end portion of the hollow-cathode.

19. A hollow-cathode type metal ion laser as claimed in claim 1, wherein each of the metal-containing reservoir means has a discharge space therein.

20. A hollow-cathode type metal ion laser comprising:

a gas-filled tubular envelope;

a hollow-cathode located within the tubular envelope, the hollow cathode having holes formed in a wall portion thereof and a bore therein;

a plurality of metal-containing reservoir means containing a metal therein and having a discharge space near the envelope for vaporizing and diffusing the metal into the discharge space near each of the holes, each metal-containing reservoir means being disposed one next to each of the holes;

a plurality of main anodes disposed one within each of the metal-containing reservoir means, each of the main anodes being disposed near one of the holes;

sub-anodes disposed one within each end portion of the envelope for confining the metal vapor within the bore;

tube means made of electrically insulating material disposed one within each of the end portions of the envelope and connected to the respective ends of the hollow cathode;

a plurality of external heaters each surrounding each of the metal-containing reservoir means for heating the reservoir means;

each of the main anodes having an end portion positioned near each hole of the cathode such that each end portion of the main anodes is baked by the radiant heat of the cathode;

each of the metal-containing reservoir means including an open area having at least near the envelope an axis substantially coaxial with the central axis of each hole;

the diameter of each hole being smaller than the inner diameter of each open area of the metal-containing reservoir means near the envelope;

the discharge space being positioned only at one side of the envelope with respect to each hole of the cathode.

21. A hollow-cathode type metal ion laser as claimed in claim 1, wherein the holes are formed at a bottom part of the wall portion at regular intervals, and wherein the metal-containing reservoir means extend downwardly.

22. A hollow-cathode type metal ion laser as claimed in claim 21, wherein the holes are placed at regular intervals of $$10\sqrt{D} \text{ mm}$$

where D is a diameter of the bore.

23. A hollow-cathode type metal ion laser, comprising:

a gas-filled tubular envelope;

a hollow cathode located within the tubular envelope, the hollow cathode having at least four tapered holes formed in a wall portion thereof and a bore therein;

at least four metal-containing reservoir means each containing a metal and having a discharge space near the envelope for vaporizing and diffusing the metal into the discharge space near each of the holes, the metal-containing reservoir means each being disposed one next to each of the holes;

at least four main anodes disposed one within each of the metal-containing reservoir means, each of the main anodes being disposed near one of the holes;

a pair of sub-anodes disposed one within each end portion of the envelope for cataphoretically returning and confining the metal ion within the bore;

tube means made of electrically insulating material disposed one within each of the end portions of the envelope and connected to the respective ends of the hollow cathode;

the hollow cathode actually or almost contacting the envelope at least near the holes;

a plurality of external heaters each surrounding each of the metal-containing reservoir means for heating the reservoir means;

each of the main anodes having an end portion positioned near each hole of the cathode such that each end portion of the main anodes is baked by the radiant heat of the cathode;

each of the metal-containing reservoir means including an open area having at least near the envelope an axis substantially coaxial with the central axis of each hole;

the diameter of each hole being smaller than the inner diameter of each metal-containing reservoir means near the envelope;

the discharge space being positioned only at one side of the envelope with respect to each hole of the cathode.

24. A hollow-cathode type metal ion laser as claimed in claim 8, wherein the holes are formed at a bottom part of the wall portion at regular intervals, and wherein the metal-containing reservoir means extend downwardly.

25. A hollow-cathode type metal ion laser as claimed in claim 24, wherein the holes are placed at regular intervals of $$10\sqrt{D} \text{ mm}$$

where D is a diameter of the bore.

26. A hollow-cathode type metal ion laser, comprising:

a gas-filled tubular envelope;

a hollow cathode located within the tubular envelope, the hollow cathode having plural holes formed in a bottom of a wall portion thereof, a bore therein and a tapered portion formed in said bore at each end portion thereof;

a plurality of metal-containing reservoir means each containing a metal and having a discharge space near the envelope for vaporizing and diffusing the metal into the discharge space near each of the holes, each metal-containing reservoir means forming a portion of the tubular envelope and being disposed one next to each of the holes;

a plurality of main anodes disposed one within each of the metal-containing reservoir means, each of the main anodes being disposed near one of the holes;

a plurality of external heaters each surrounding each of the metal-containing reservoir means for heating the reservoir means;

each of the main anodes having an end portion positioned near each hole of the cathode such that each end portion of the main anodes is baked by the radiant heat of the cathode;

each of the metal-containing reservoir means including an open area having at least near the envelope an axis substantially coaxial with the central axis of each hole;

the diameter of each hole being smaller than the inner diameter of each metal-containing reservoir means near the envelope;

the discharge space being positioned only at one side of the envelope with respect to each hole of the cathode.

27. A hollow-cathode type metal ion laser as claimed in claim 24, wherein the holes are formed at regular intervals, and wherein the metal-containing reservoir means extend downwardly.

28. A hollow-cathode type metal ion laser as claimed in claim 27, wherein the holes are placed at regular intervals of $$10\sqrt{D} \text{ mm}$$

where D is a diameter of the bore.

* * * * *

UNITED STATES PATENT AND TRADEMARK OFFICE
CERTIFICATE OF CORRECTION

PATENT NO.  : 4,821,280
DATED       : April 11, 1989
INVENTOR(S) : Hiromi Kawase It is certified that error appears in the above-identified patent and that said Letters Patent is hereby corrected as shown below: Title page:

In the Abstract, line 3, change "enelope" to --envelope--.

In the Abstract, line 15, change "on" to --one--.

Column 4, line 62, change "hollowcathode" to --hollow-cathode--.

Column 7, line 26, change "six" to --sixth--.

Column 8, line 6, change the comma (,) to a period (.).

Column 8, line 16, delete "the" (third occurrence).

Column 10, line 8, change "n" to --in--.

Column 12, line 1, change "$10\underline{\sqrt{D}}$ mm" to -- $10\sqrt{D}$ mm --.

Column 12, line 50, change "$10\underline{\sqrt{D}}$ mm" to --$10\sqrt{D}$ mm --.

Signed and Sealed this

Twenty-sixth Day of December, 1989

*Attest:*

JEFFREY M. SAMUELS

*Attesting Officer*       *Acting Commissioner of Patents and Trademarks*